US011991797B2

(12) United States Patent
Chou et al.

(10) Patent No.: US 11,991,797 B2
(45) Date of Patent: May 21, 2024

(54) LED POWER SUPPLY WITH BI-LEVEL DIMMING AND BI-LEVEL DIMMING METHOD

(71) Applicant: DELTA ELECTRONICS, INC., Taoyuan (TW)

(72) Inventors: Ching-Ho Chou, Taoyuan (TW); Yung-Chuan Lu, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days.

(21) Appl. No.: 18/155,509

(22) Filed: Jan. 17, 2023

(65) Prior Publication Data

US 2024/0130014 A1 Apr. 18, 2024

(30) Foreign Application Priority Data

Oct. 12, 2022 (CN) ........................ 202211247783.4

(51) Int. Cl.
*H05B 45/10* (2020.01)
*H05B 45/3725* (2020.01)

(52) U.S. Cl.
CPC ......... *H05B 45/10* (2020.01); *H05B 45/3725* (2020.01)

(58) Field of Classification Search
CPC ............................ H05B 45/10; H05B 45/3725
See application file for complete search history.

(56) References Cited

U.S. PATENT DOCUMENTS

2011/0199024 A1* 8/2011 Lin .................... H05B 41/2825 315/307
2013/0119887 A1* 5/2013 Clark ..................... H05B 45/44 315/291
2016/0095187 A1* 3/2016 Chen .................... H05B 39/044 315/158
2018/0084615 A1* 3/2018 Kong .................. H05B 45/385

* cited by examiner

*Primary Examiner* — Minh D A
(74) *Attorney, Agent, or Firm* — Muncy, Geissler, Olds & Lowe, P.C.

(57) ABSTRACT

A LED power supply with bi-level dimming receives an input voltage to supply power to an LED lamp, and adjusts the brightness of the LED lamp according to whether an external detection switch is triggered to be turned on. The LED power supply includes a conversion circuit, a switch, and an oscillation circuit. The conversion circuit converts the input voltage into an output voltage, and provides the output voltage to supply power to the LED lamp so as to control the LED lamp to provide a first brightness. The oscillation circuit provides a dimming signal with a fixed frequency and a duty cycle to the switch when the external detection switch is turned on so as to turn on and turn off the switch. The switch correspondingly adjusts the output voltage according to the dimming signal to control the LED lamp to provide a second brightness.

9 Claims, 13 Drawing Sheets

LED POWER SUPPLY WITH BI-LEVEL DIMMING AND BI-LEVEL DIMMING METHOD

BACKGROUND

Technical Field

The present disclosure relates to an LED power supply and a dimming method, and more particularly to an LED power supply with bi-level dimming and a bi-level dimming method.

Description of Related Art

The statements in this section merely provide background information related to the present disclosure and do not necessarily constitute prior art.

Please refer to FIG. 1, which shows a schematic diagram of a circuit structure of a conventional fluorescent lamp lighting system. The current bi-level dimming control is achieved by using the lighting power supply apparatus 100A and the fluorescent lamp 1A with the photo sensor 4A (i.e., photo detector sensor, PD sensor). The conventional lighting power supply apparatus 100A can adjust the power output by connecting the dimming control port to the commercial power by receiving the control signal provided from the photo sensor 4A (as shown in FIG. 1). Alternatively, the bi-level dimming control can be realized through a standard 0 to 10-volt dimming interface, but the design cost is high. In FIG. 1, the control system of the conventional fluorescent lamp 1A can only achieve two output brightness levels of 100% and 60%, and cannot provide the function of lower output brightness.

On the other hand, LED lighting has largely replaced fluorescent lamp 1A as the mainstream lighting system, and the LED power supply mainly supplies energy through the mains (North American power system is 120 to 277 volts, European power system is 220 to 240 volts, Japan power system is 100 to 242 volts, and Canadian power system is 120 to 347 volts). However, if the control method of the lighting system of fluorescent lamp 1A is used, the design of the dimming control port connecting to the mains power still needs to consider the high input voltage, lightning surge protection, and so on.

Therefore, compared with the current dimming control port that is connected to the input end (high voltage end), the design should also consider issues such as lightning surge protection. It is a major subject that how to use the characteristics of LED output as low voltage DC and change the control port to the output to simplify the design under the consideration of the power output of the LED lighting system be low voltage below 60 volts and the LED power supply 100 complying with the specification of UL 1310 Class 2.

SUMMARY

In order to solve the above-mentioned problems, the present disclosure provides a new control method, which designs the control signal received from the external detection switch (PD sensor) to the power output end of 12 volts or 24 volts, and then adjusts the bi-level dimming output of the power supply to realize the PWM dimming technology with built-in oscillation circuit above 1 KHz for constant voltage output. Therefore, the LED power supply with bi-level dimming receives an input voltage to supply power to an LED lamp, and adjusts the brightness of the LED lamp according to whether an external detection switch is triggered to be turned on. The LED power supply includes a conversion circuit, a switch, and an oscillation circuit. The conversion circuit converts the input voltage into an output voltage, and provides the output voltage to supply power to the LED lamp through a bus positive end and a bus negative end so as to control the LED lamp to provide a first brightness. The switch is coupled to the bus positive end or the bus negative end. The oscillation circuit includes a dimming end and a control end. The control end is coupled to the switch, and the dimming end is coupled to the external detection switch. The oscillation circuit is coupled to the other of the bus positive end and the bus negative end through the dimming end when the external detection switch is turned on so as to provide a dimming signal with a fixed frequency and a duty cycle to the switch through the control end; the switch correspondingly adjusts the output voltage according to the dimming signal to control the LED lamp to provide a second brightness.

In order to solve the above-mentioned problems, the present disclosure provides a bi-level dimming method for an LED power supply. The method includes steps of: controlling a conversion circuit to convert an input voltage into an output voltage, and providing the output voltage to supply power to an LED lamp so as to control the LED lamp to provide a first brightness; providing a dimming signal with a fixed frequency and a duty cycle to turn on or turn off a switch when an external detection switch is triggered to be turned on; adjusting the output voltage to correspond to the dimming signal by turning on or turning off the switch so as to control the LED lamp to provide a second brightness.

The main purpose and effect of the present disclosure is that the oscillation circuit is used to provide a dimming signal with a fixed frequency and a duty cycle to adjust the output voltage, and the oscillation circuit is designed to a 12-volt or 24-volt low-voltage output end to receive the output voltage of an external detection switch (PD sensor) coupled to the voltage output end, thereby achieving 100% and 30% bi-level dimming output.

It is to be understood that both the foregoing general description and the following detailed description are exemplary, and are intended to provide further explanation of the present disclosure as claimed. Other advantages and features of the present disclosure will be apparent from the following description, drawings and claims.

BRIEF DESCRIPTION OF DRAWINGS

The present disclosure can be more fully understood by reading the following detailed description of the embodiment, with reference made to the accompanying drawing as follows.

DETAILED DESCRIPTION

Figure 1:
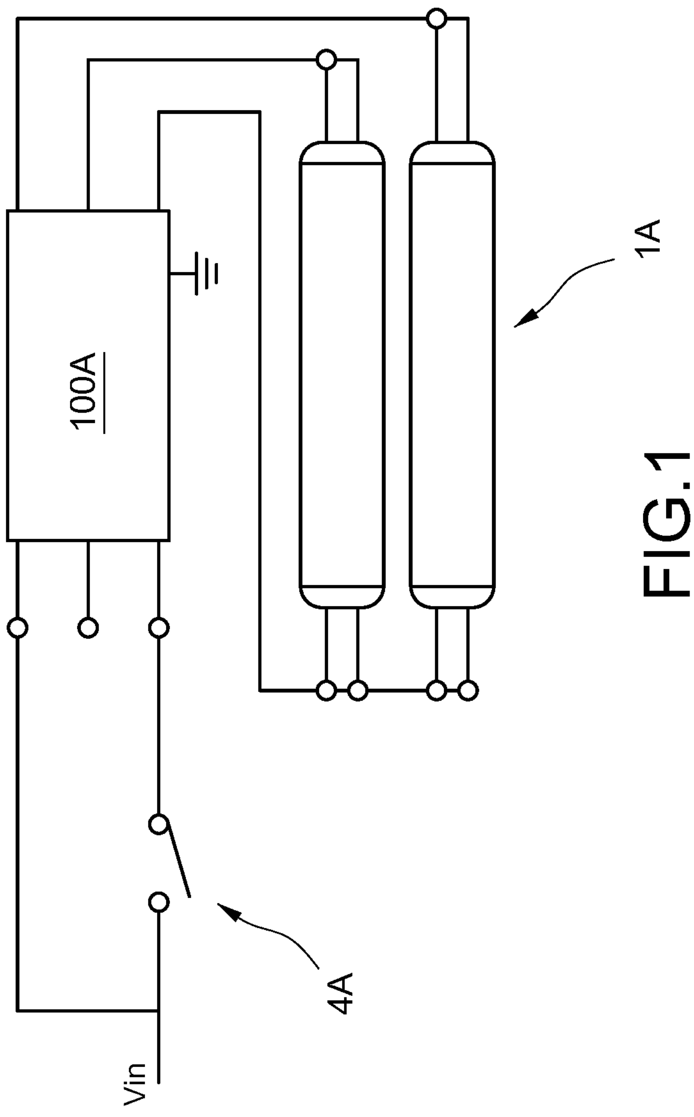
FIG.1 (Related Art)
FIG. 1 is a schematic diagram of a circuit structure of a conventional fluorescent lamp lighting system.

Reference will now be made to the drawing figures to describe the present disclosure in detail. It will be understood that the drawing figures and exemplified embodiments of present disclosure are not limited to the details thereof.

Figure 2:
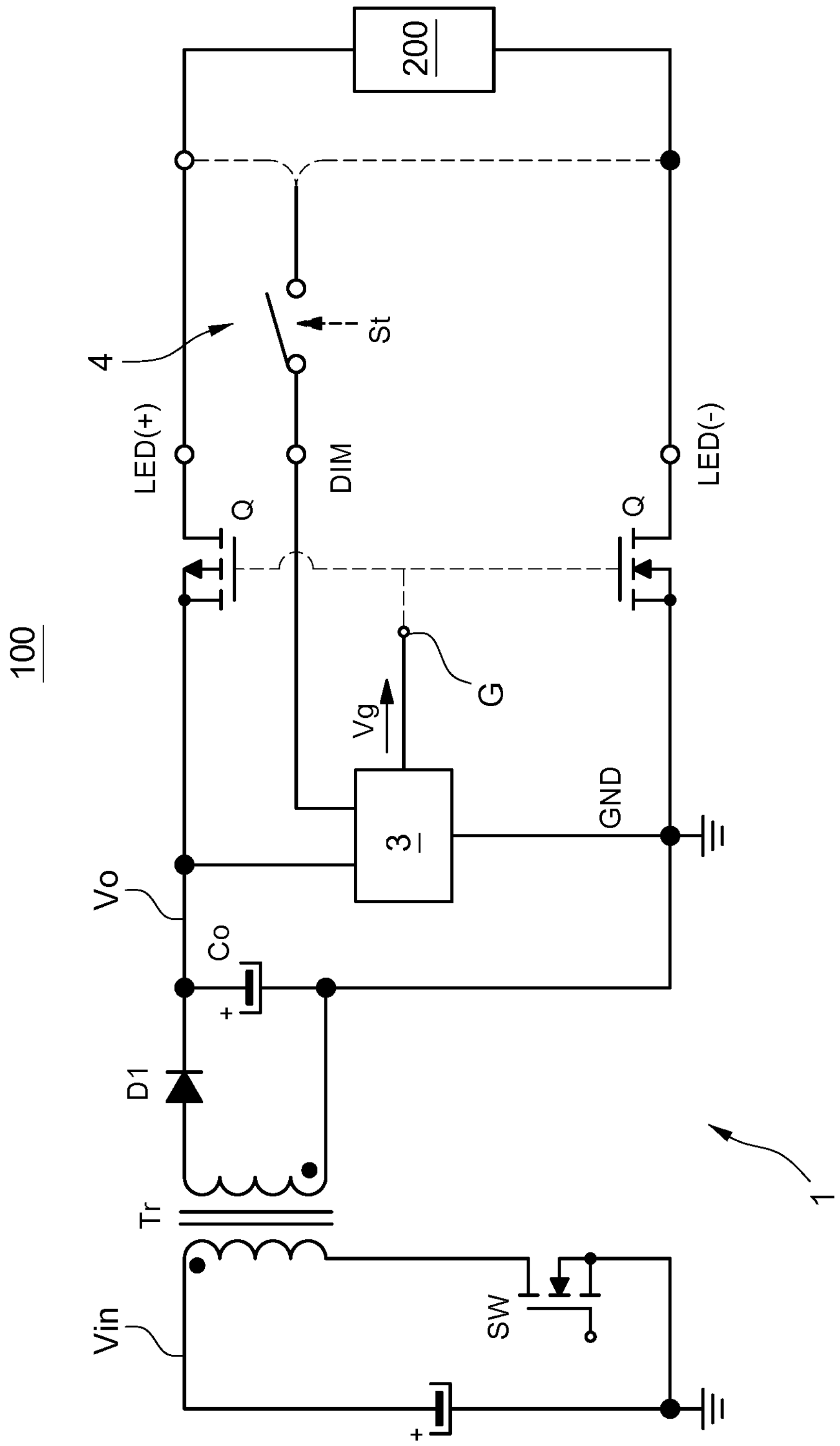
FIG. 2 is a block circuit diagram of an LED power supply with bi-level dimming according to the present disclosure.

Please refer to FIG. 2, which shows a block circuit diagram of an LED power supply with bi-level dimming according to the present disclosure, and also refer to FIG. 1. An LED power supply system includes an LED power supply 100, an LED lamp 200, and an external detection switch 4, such as a PD sensor. The LED power supply 100 receives an input voltage Vin and supplies power to the LED lamp 200. In particular, the LED power supply 100 complies with the specification of UL 1310 Class 2, and can generally provide an output voltage Vo of 12 volts or 24 volts to a load. The external detection switch 4 is coupled between a dimming end DIM and a bus positive end LED(+) or a bus negative end LED(−) of the LED power supply 100, and between the dimming end DIM and the LED lamp 200. The external detection switch 4 is arranged at a low-voltage output end to connect the output voltage Vo of 12 volts or 24 volts. The LED power supply 100 includes a conversion circuit 1, a switch Q, and an oscillation circuit 3. The conversion circuit 1 is coupled to the LED lamp 200. The conversion circuit 1 converts an input voltage Vin into the output voltage Vo, and provides the output voltage Vo to supply power to the LED lamp 200 through the bus positive end LED(+) and the bus negative end LED(−) so as to control the LED lamp 200 to provide a first brightness.

The conversion circuit 1 may be an isolated DC/DC converter, for example, but not limited to, a flyback circuit architecture. An input end of the conversion circuit 1 is bulk capacitor, and the input end is connected to a front-stage circuit, such as, but not limited to, a PFC circuit. Tr is an isolated transformer of the flyback. SW is a power switch of the flyback, generally using MOSFET. D1 is an output rectifier diode of the flyback, and under the DC output specification of 12 volts or 24 volts, a Schottky diode is generally used. Co is an output capacitor, and is used to provide a stable DC voltage after filtering. The bus positive end LED(+) is connected to a positive end of the output capacitor Co to provide the 12-volt or 24-volt voltage to the LED lamp 200. In particular, the output voltage Vo of the conversion circuit 1 for controlling the LED lamp 200 to provide the first brightness may be a constant voltage, and the first brightness may be 100% brightness. The switch Q may be, for example, but not limited to, a MOSFET, and is coupled to one of the bus positive end LED(+) and the bus negative end LED(−) (represented by dotted lines).

The oscillation circuit 3 includes a dimming end DIM and a control end G, and the control end G is coupled to the switch Q. A first end of the external detection switch 4 is coupled to the dimming end DIM, and a second end of the external detection switch 4 is opposite to the switch Q, and is coupled to the other of the bus positive end LED(+) and the bus negative end LED(−) (represented by dotted lines), and the external detection switch 4 is triggered to be turned on or turned off by the trigger signal St. For example, but not limited to, the switch Q is coupled to the bus positive end LED(+), and the external detection switch 4 is coupled to the bus negative end LED(−). In particular, the external detection switch 4 is, for example, but not limited to, a touch external detection switch, an inductive external detection switch, etc. The external detection switch 4 is controlled to be turned on or turned off according to the trigger signal St provided by different trigger manners, that is, the external detection switch 4 may be achieved by using a photo detector sensor (PD sensor). Furthermore, when the external detection switch 4 is triggered to be turned on by the trigger signal St, the oscillation circuit 3 is coupled to the other of the bus positive end LED(+) and the bus negative end LED(−) according to the position where the external detection switch 4 is coupled to the bus positive end LED(+) or the bus negative end LED(−) so that the oscillation circuit 3 provides a dimming signal Vg with a fixed frequency and a duty cycle to the switch Q. The switch Q correspondingly adjusts the output voltage Vo according to the dimming signal Vg to control the LED lamp 200 to provide a second brightness.

Specifically, the oscillation circuit 3 controls the switch Q to be repeatedly turned on and turned off through the dimming signal Vg with the fixed frequency and the duty cycle so as to adjust the output voltage Vo to a voltage waveform with a fixed frequency and a duty cycle. In particular, the voltage waveform with the fixed frequency and the duty cycle is used to reduce the brightness of the LED lamp 200. When the duty cycle is smaller, the brightness of the LED lamp 200 is lower. In order to save power consumption when the installation space is empty and avoid the space being too dark, the duty cycle is preferably 30% of the brightness of the second brightness generated by the LED lamp 200. That is, the dimming signal Vg is a pulse-width modulation signal, and is a pulse-width modulation signal with an asymmetric duty cycle (i.e., a duty cycle below 50%).

In one embodiment, the oscillation circuit 3 may be an astable multivibrator oscillator circuit, an LM555 timing circuit, an oscillator circuit composed of circuit components, or a control unit composed of a software program. In addition, the fixed frequency is mainly for stabilizing the brightness of the LED lamp 200 and avoiding the situation where the brightness is flickering. The frequency is preferably greater than 1 KHz and much lower than the frequency of the conversion circuit (for example, but not limited to, 65 KHz), thereby avoiding the phenomenon that the frequency is too low, the human eye feels the flickering of the LED lights 200. In particular, the frequency is best with a low frequency oscillation of 1 KHz.

Figure 3A:
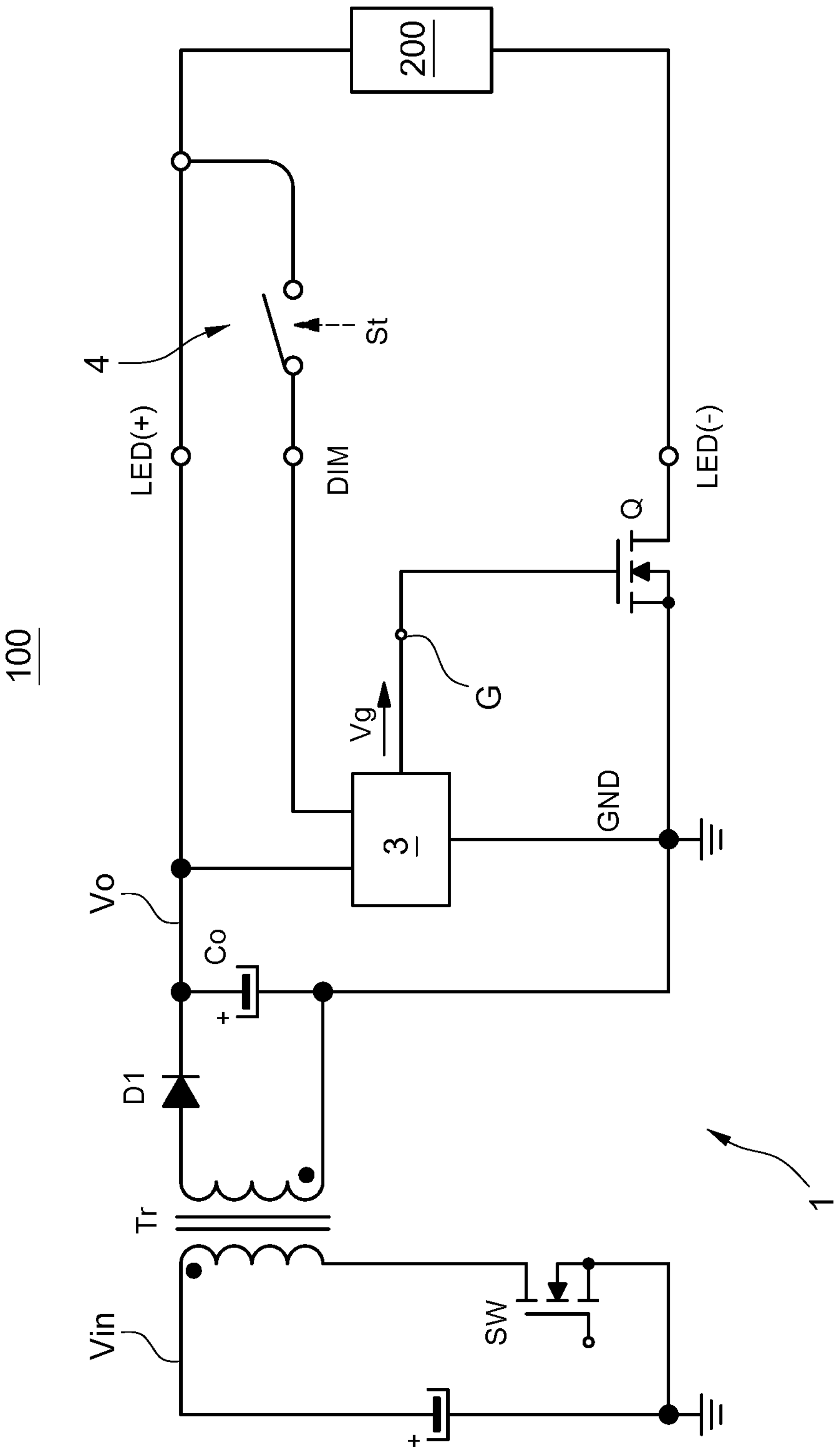
FIG. 3A is a block circuit diagram of the LED power supply with bi-level dimming according to a first embodiment of the present disclosure.
Figure 3B:
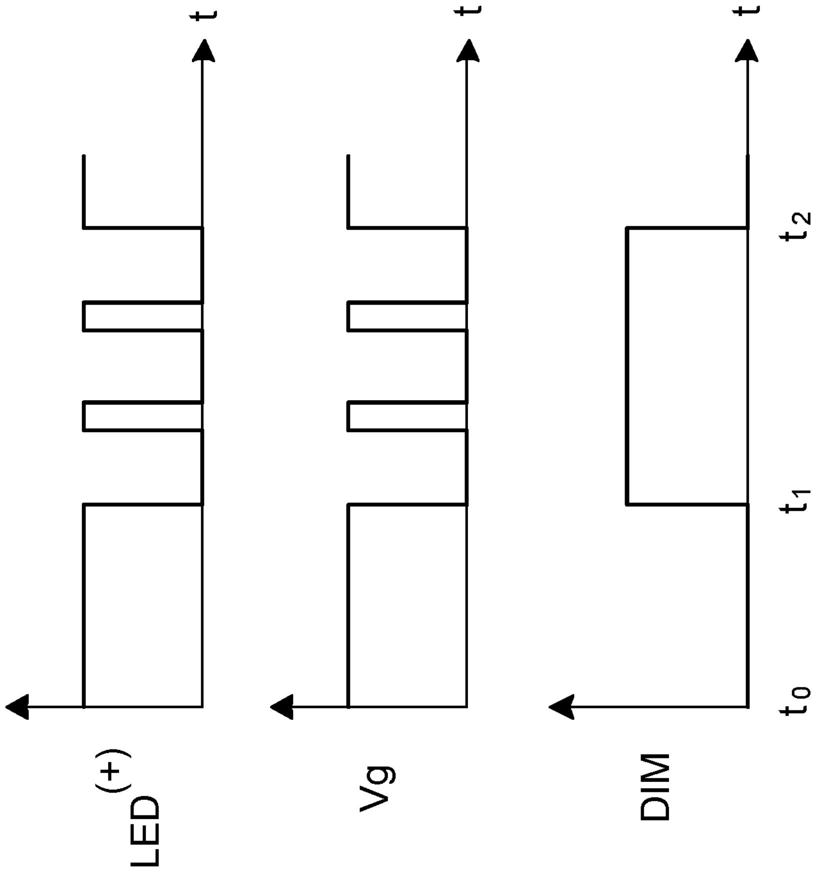
FIG. 3B is a schematic waveform of the LED power supply with bi-level dimming according to the first embodiment of the present disclosure.

Please refer to FIG. 3A and FIG. 3B, which show a block circuit diagram and a schematic waveform of the LED power supply with bi-level dimming according to a first embodiment of the present disclosure, and also refer to FIG. 2. In this embodiment, the switch Q is coupled to the bus negative end LED(−), and the second end of the external detection switch 4 is coupled to the bus positive end LED (+). When the external detection switch 4 is triggered to be turned off by the trigger signal St, the voltage received by the dimming end DIM is shown as time t0 to time t1. The oscillation circuit 3 controls the switch Q to be normally on through the dimming signal Vg, and therefore the conversion circuit 1 is controlled to provide the DC (direct-current) output voltage Vo to control the LED lamp 200 to provide the first brightness (for example, 100% brightness). When the external detection switch 4 is triggered to be turned on by the trigger signal St, the voltage received by the dimming end DIM is shown as time t1 to time t2. The oscillator circuit 3 controls the switch Q to be repeatedly turned on and turned off through the dimming signal Vg with a fixed frequency and a duty cycle so as to control the conversion circuit 1 to provide a DC output voltage Vo with a fixed frequency and a duty cycle, thereby controlling the LED lamp 200 to provide the second brightness (for example, 30% brightness). In this embodiment, according to the LED light source and the manufacturer's product specifications, the bi-level dimming output of 100% and 20%, or that of 100% and 10% can also be further achieved.

Figure 3C:
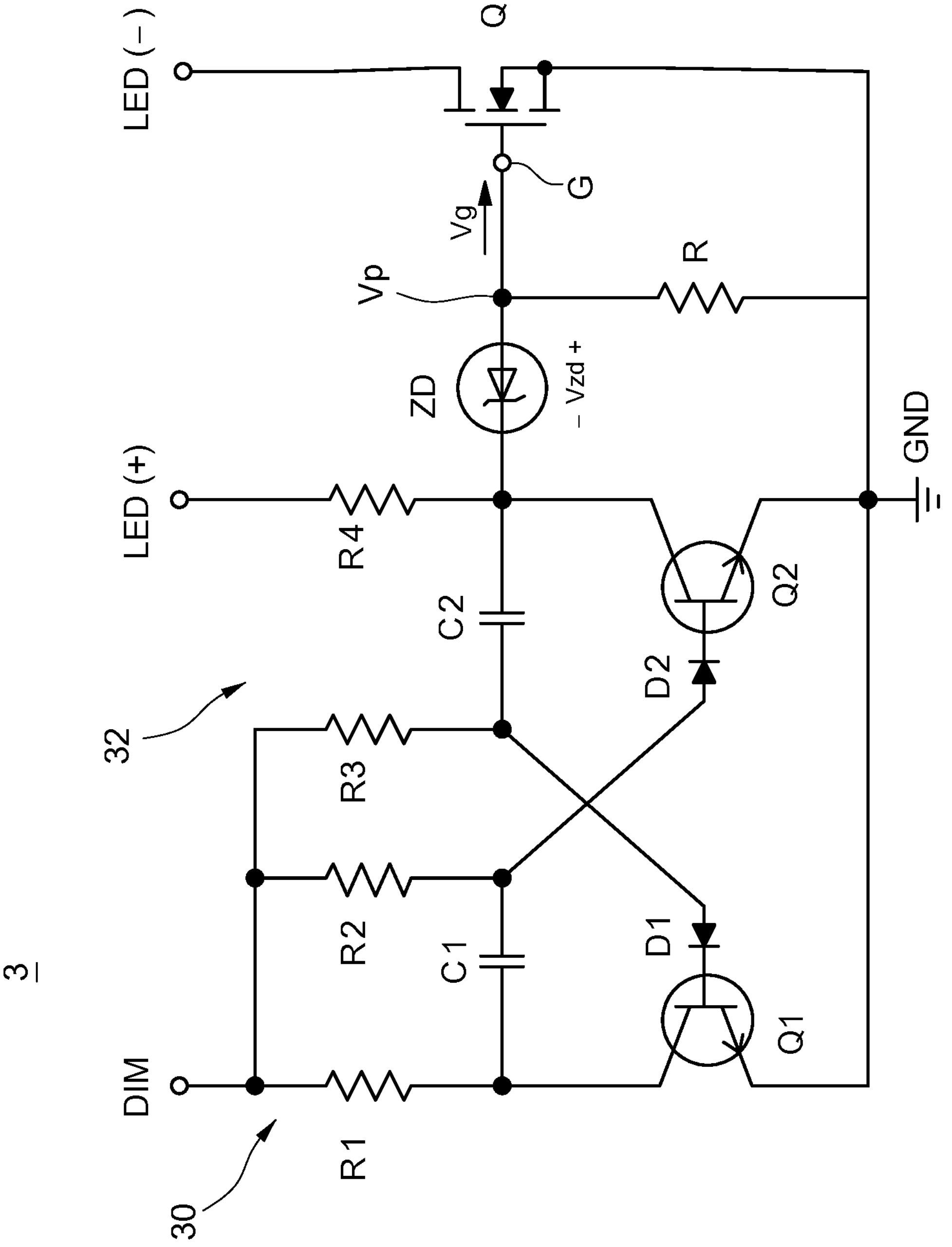
FIG. 3C is a block diagram of an oscillation circuit according to a first embodiment of the present disclosure.

Please refer to FIG. 3C, which shows a block diagram of an oscillation circuit according to a first embodiment of the present disclosure, and also refer to FIG. 2 to FIG. 3B. In addition to the dimming end DIM and the control end G, the oscillation circuit 3 also includes a first charging/discharging circuit 30, a second charging/discharging circuit 32, a first transistor Q1 (having a first end, a second end, and a control end), a second transistor Q2 (having a first end, a second end, and a control end), and a voltage dividing resistor R. The first transistor Q1 and the second transistor Q2 may be bipolar transistors, and the first transistor Q1 and the second transistor Q2 are NPN type. When the external detection switch 4 is triggered to be turned off, the switch Q is turned on by the divided voltage Vp generated between the second charging/discharging circuit 32 and the voltage dividing resistor R according to the output voltage Vo. When the external detection switch 4 is triggered to be turned on, the dimming end DIM of the oscillation circuit 3 receives the output voltage Vo, and provides the dimming signal Vg with a fixed frequency and a duty cycle according to the output voltage Vo to control the switch Q to be turned on and turned off repeatedly.

Specifically, when the dimming end DIM receives the output voltage Vo, the first charging/discharging circuit 30 and the second charging/discharging circuit 32 receives the output voltage Vo through the dimming end DIM. The output voltage Vo charges the second charging/discharging circuit 32 to a first predetermined voltage V1 so as to turn on the first transistor Q1. When the first transistor Q1 is turned on, the first charging/discharging circuit 30 provides a first reverse voltage Vr1 to turn off the second transistor Q2, and the output voltage Vo starts to charge the first charging/discharging circuit 30 through the dimming end DIM. In this condition, the divided voltage Vp is generated by the output voltage Vo between the second charging/discharging circuit 32 and the voltage dividing resistor R so as to provide the dimming signal Vg with high level to turn on the switch Q.

In addition, the output voltage Vo charges the first charging/discharging circuit 30 to a second predetermined voltage V2 so as to turn on the second transistor Q2. When the second transistor Q2 is turned on, the second charging/discharging circuit 32 provides a second reverse voltage Vr2 to turn off the first transistor Q1, and the output voltage Vo starts to charge the second charging/discharging circuit 32 through the dimming end DIM. In this condition, the divided voltage Vp is generated by the output voltage Vo between the second charging/discharging circuit 32 and the voltage dividing resistor R so that the dimming end DIM is grounded (i.e., coupled to the bus negative end LED(−)) to provide the dimming signal Vg with low level to turn off the switch Q. When the output voltage Vo is provided to the dimming end DIM through the bus positive end LED(+), one of the first transistor Q1 and the second transistor Q2 is first turned on, and that depends on which of the first charging/discharging circuit 30 and the second charging/discharging circuit 32 is charged to the predetermined voltage first, and then the first transistor Q1 and the second transistor Q2 is tuned on and turned off in turn according to the above-mentioned operation process.

Specifically, the first charging/discharging circuit 30 includes a first resistor R1 (having a first end and a second end), a second resistor R2 (having a first end and a second end), and a first capacitor C1 (having a first end and a second end); the second charging/discharging circuit 32 includes a third resistor R3 (having a first end and a second end), a fourth resistor R4 (having a first end and a second end), and a second capacitor C2 (having a first end and a second end). The first end of the first resistor R1 is coupled to the dimming end DIM, and the second end of the first resistor R1 is coupled to the first end of the first transistor Q1. The first end of the second resistor R2 is coupled to the dimming end DIM, and the second end of the second resistor R2 is coupled to the control end of the second transistor Q2. The first end of the first capacitor C1 is coupled to the second end of the first resistor R1, and the second end of the first capacitor C1 is coupled to the second end of the second resistor R2.

A first end of the third resistor R3 is coupled to the dimming end DIM, and a second end of the third resistor R3 is coupled to the control end of the first transistor Q1. A first end of the fourth resistor R4 is coupled to the bus positive end LED(+), and a second end of the fourth resistor R4 is coupled to the first end of the second transistor Q2. A first end of the second capacitor C2 is coupled to the second end of the third resistor R3, and a second end of the second capacitor C2 is coupled to the second end of the fourth resistor R4. The voltage dividing resistor R is coupled between the second end of the fourth resistor R4 and the bus negative end LED(−), and the fourth resistor R4 and the voltage diving resistor R form a voltage dividing circuit so that a divided voltage Vp is generated by the output voltage Vo at a node between the fourth resistor R4 and the voltage dividing resistor R. The second end of the first transistor Q1 and the second end of the second transistor Q2 are coupled to the bus negative end LED(−).

In addition, the first charging/discharging circuit 30 further includes a first diode D1, and the second charging/discharging circuit 32 further includes a second diode D2. A cathode of the first diode D1 is coupled to the control end of the first transistor Q1, and an anode of the first diode D1 is coupled to the first end of the second capacitor C2 and the second end of the third resistor R3. A cathode of the second diode D2 is coupled to the control end of the second transistor Q2, and an anode of the second diode D2 is coupled to the second end of the first capacitor C1 and the second end of the second resistor R2. The first diode D1 and the second diode D2 are used to protect the first transistor Q1 and the second transistor Q2 respectively so as to prevent the first transistor Q1 and the second transistor Q2 from being abnormal or even damaged due to a high voltage across the control end and the second end before the first transistor Q1 and the second transistor Q2 are turned off.

Figure 4A:
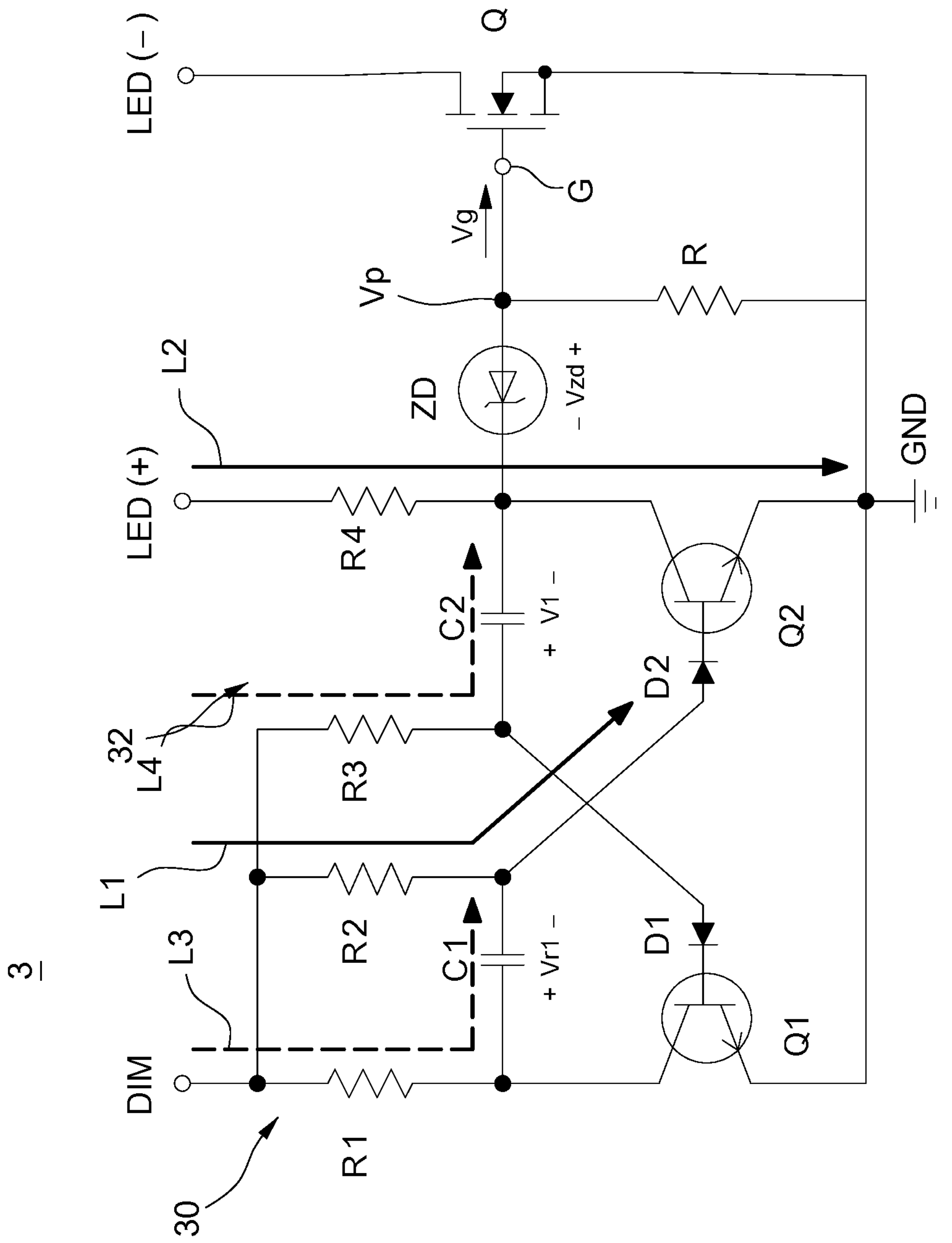
FIG. 4A is a schematic diagram of a first state of a current path of the oscillation circuit according to the first embodiment of the present disclosure.
Figure 4B:
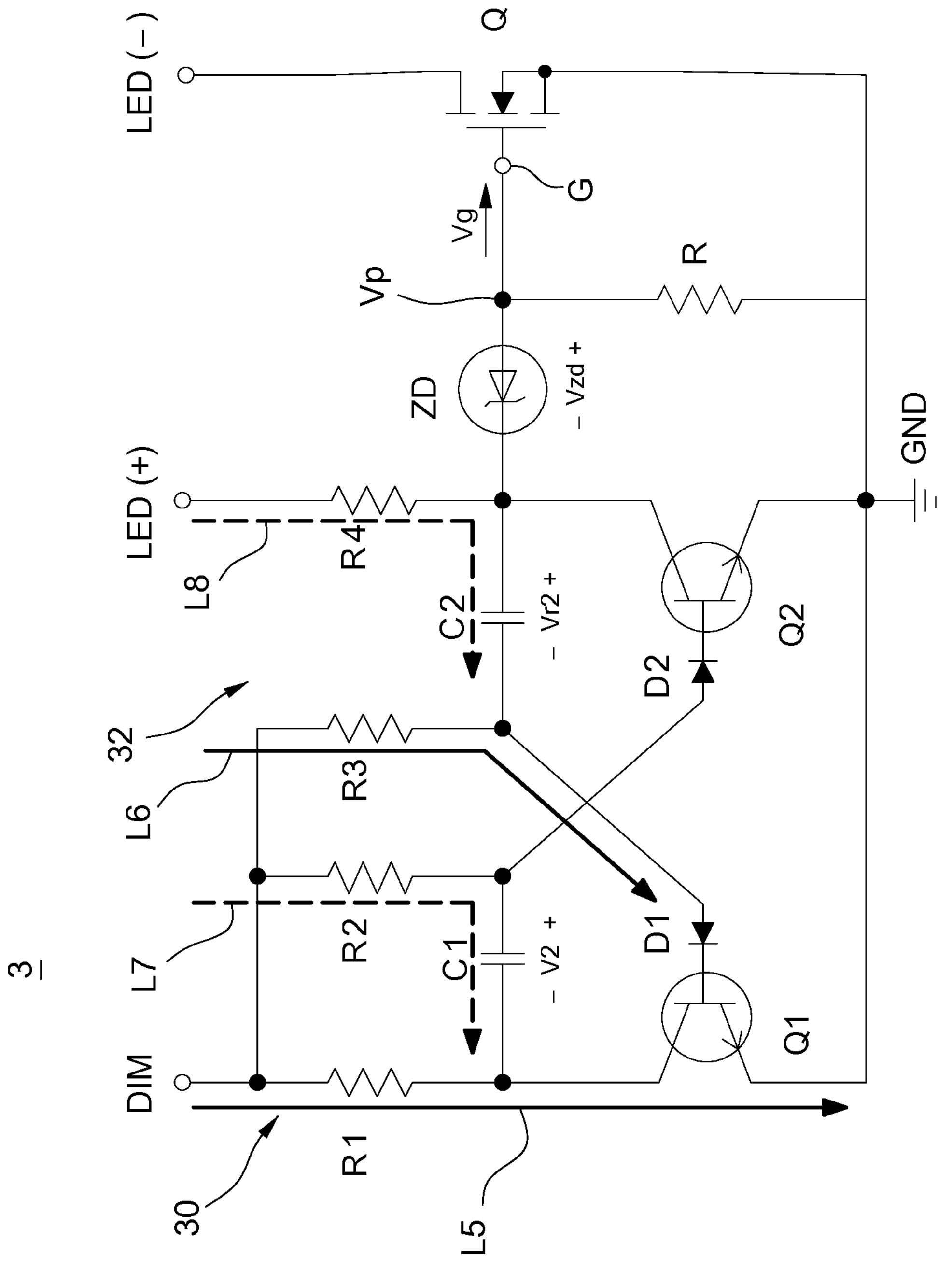
FIG. 4B is a schematic diagram of a second state of a current path of the oscillation circuit according to the first embodiment of the present disclosure.

Please refer to FIG. 4A and FIG. 4B, which show schematic diagrams of a first state and a second state of a current path of the oscillation circuit according to the first embodiment of the present disclosure, respectively. The second resistor R2 and the third resistor R3 are starting resistors of the second transistor Q2 and the first transistor Q1, respectively. When the external detection switch 4 is triggered to be turned on by the trigger signal St, the output voltage Vo is provided to the dimming end DIM through the bus positive end LED(+). In this condition, one of the first transistor Q1 and the second transistor Q2 is first turned on. FIG. 4A illustrates the turning on of the second transistor Q2, and current paths L1 and L2 are for the saturation mode in which the second transistor Q2 is turned on, and current paths L3 and L4 prepare for turning on the first transistor Q1. Specifically, when the second capacitor C2 is charged to a first predetermined voltage V1, for example, but not limited to, 0.7 volts, the first transistor Q1 is turned on so that the first capacitor C1 is charged to a first reverse voltage Vr1, for example, but not limited to, 12 volts or 24 volts. Therefore, when the first transistor Q1 is turned on, the first capacitor C1 provides the first reverse voltage Vr1 to turn off the second transistor Q2. Since the first capacitor C1 provides the first reverse voltage Vr1 of 12 volts or 24 volts before the second transistor Q2 is reversely turned off, the second transistor Q2 may be abnormal or damaged if the first reverse voltage Vr1 is directly across between the control end and the second end of the second transistor Q2. Therefore, the second diode D2 may be disposed between the first capacitor C1 and the second transistor Q2 to protect the second transistor Q2.

FIG. 4B illustrates the turning on of the first transistor Q1, and current paths L5 and L6 are for the saturation mode in which the first transistor Q1 is turned on, and current paths L7 and L8 prepare for turning on the second transistor Q2. Specifically, when the first capacitor C1 is charged to a second predetermined voltage V2, for example, but not limited to, 0.7 volts, the second transistor Q2 is turned on so that the second capacitor C2 is charged to a second reverse voltage Vr2, for example, but not limited to, 12 volts or 24 volts. Therefore, when the second transistor Q2 is turned on, the second capacitor C2 provides the second reverse voltage Vr2 to turn off the first transistor Q1. Similarly, in order to prevent the second reverse voltage Vr2 from directly crossing between the control end and the second end of the first transistor Q1, the first diode D1 may be disposed between the second capacitor C2 and the first transistor Q1 to protect the first transistor Q1. Accordingly, during the continuous turned-on and turned-off process of the first transistor Q1 and the second transistor Q2, a fixed low-frequency oscillation is provided to control the switch Q to be turned on and turned off so as to realize the bi-level dimming function.

Further, since the second brightness is at least less than half of the 100% brightness, the required duty cycle is usually lower than 50%. Therefore, the charging and discharging speeds of the first capacitor C1 and the second capacitor C2 should be specially adjusted so as to provide the dimming signal Vg with a duty ratio lower than 50%. Specifically, since the turned-on time of the first transistor Q1 determines the turned-on time of the switch Q, and the turned-on time of the second transistor Q2 determines the turned-off time of the switch Q, the turned-on time of the second transistor Q2 should be longer than the turned-on time of the first transistor Q1 so as to generate the dimming signal Vg with a duty cycle lower than 50%. Therefore, charging time constants of the second resistor R2 and the first capacitor C1 should be lower than charging time constants of the third resistor R3 and the second capacitor C2 so that the turned-on time of the second transistor Q2 is relatively longer.

The oscillation circuit 3 further includes a clamping circuit ZD, and the clamping circuit ZD is coupled between the second charging/discharging circuit 32 and the voltage diving resistor R, that is, between the second end of the fourth resistor R4 and the voltage dividing resistor R. According to the output voltage being greater than a threshold value, the clamping circuit ZD provides a clamping voltage Vzd to control the divided voltage Vp to be lower than a predetermined value. Specifically, the voltage of the bus positive end LED(+) is divided by the fourth resistor R4 and the voltage dividing resistor R, and then provided to the control end G to drive the switch Q. Especially, in a non-dimming state when the dimming end DIM is not coupled to the bus positive end LED(+), the switch Q is normally on. If the bus positive end LED(+) is a higher voltage (for example, but not limited to, 24 volts), the clamping circuit ZD may be stepped down to make the divided voltage Vp be lower than the predetermined value (for example, but not limited to, 20 volts) so as to avoid voltages higher than a voltage of driving a gate of the switch Q. Conversely, if the bus positive end LED(+) is a lower voltage (for example, but not limited to, 12 volts), it is to just short the clamping circuit ZD (make the clamping circuit ZD be short-circuited). Alternatively, by a bypass external detection switch (not shown) in parallel with the clamping circuit ZD, and turning on or turning off the bypass external detection switch by detecting the output voltage Vo so as to automatically bypass the clamping circuit ZD. In one embodiment, the clamping circuit ZD may be a Zener diode, but not limited to this.

Figure 5A:
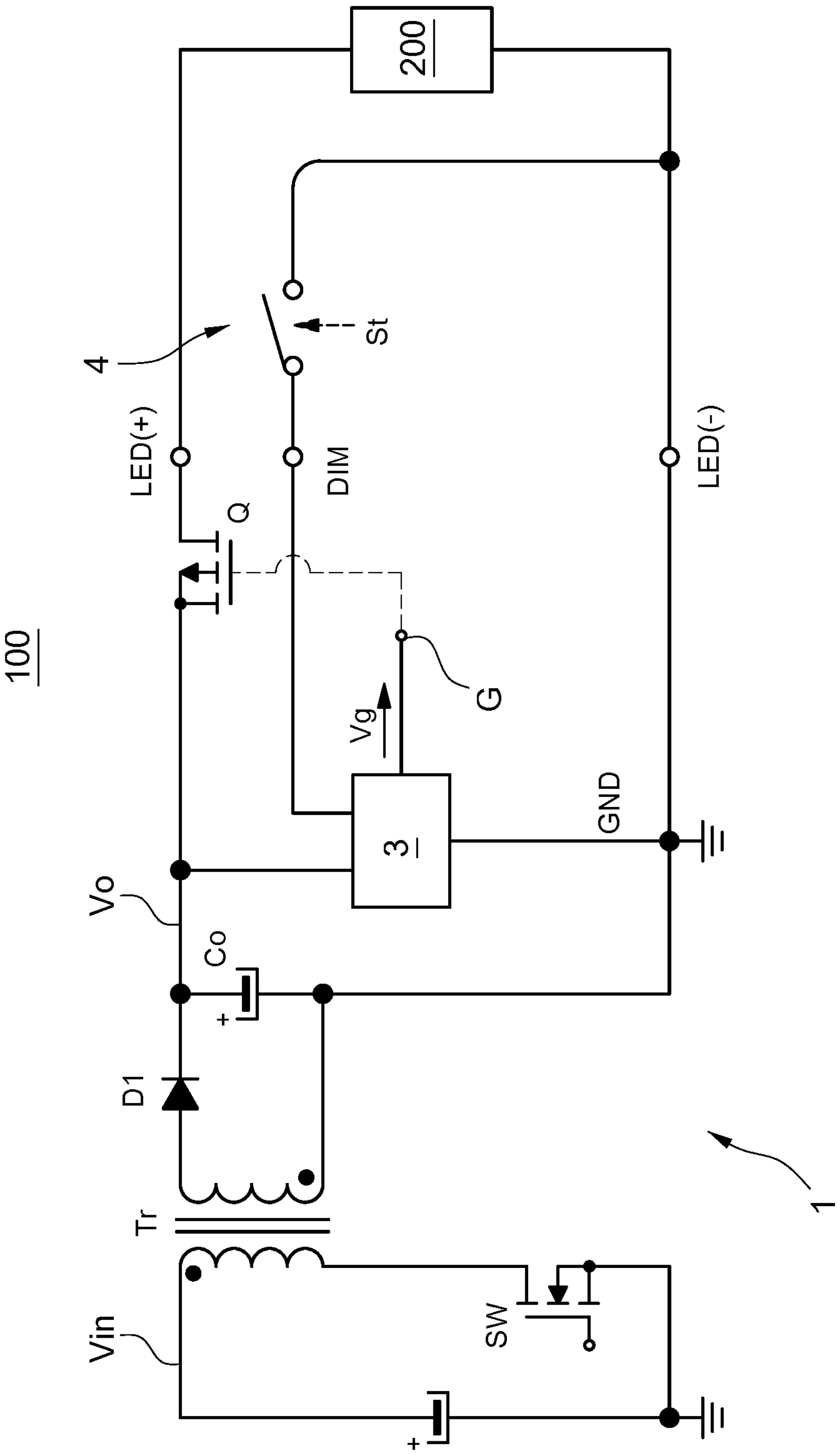
FIG. 5A is a block circuit diagram of the LED power supply with bi-level dimming according to a second embodiment of the present disclosure.
Figure 5B:
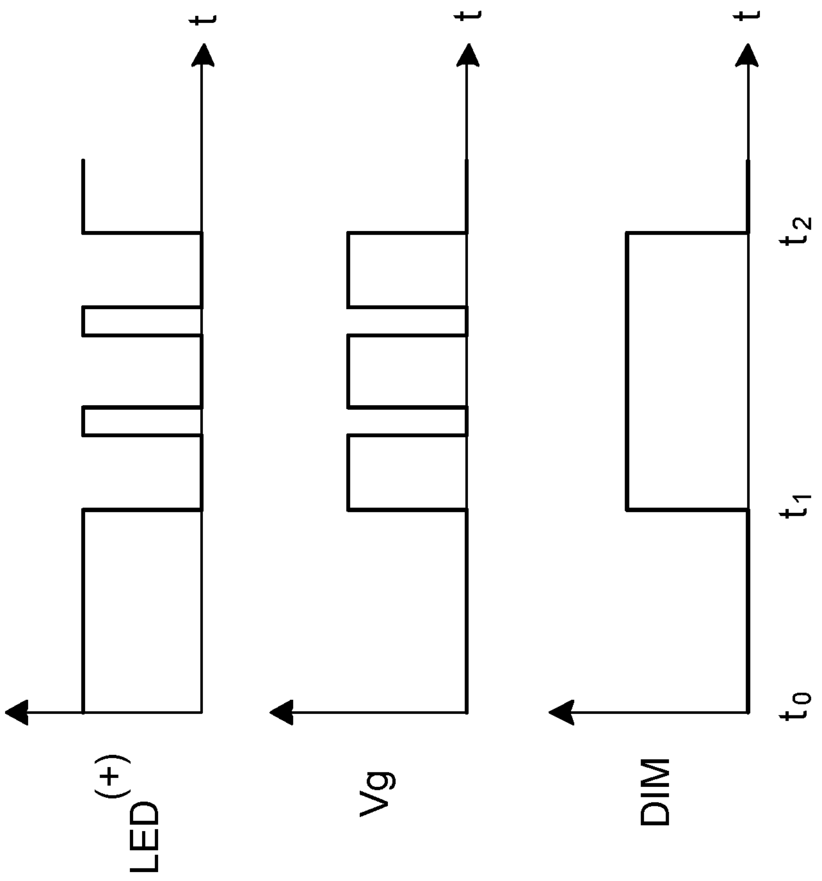
FIG. 5B is a schematic waveform of the LED power supply with bi-level dimming according to the second embodiment of the present disclosure.

Please refer to FIG. 5A and FIG. 5B, which show a block circuit diagram and a schematic waveform of the LED power supply with bi-level dimming according to the second embodiment of the present disclosure, and also refer to FIG. 2. In this embodiment, the switch Q is coupled to the bus positive end LED(+), and the second end of the external detection switch 4 is coupled to the bus negative end LED(−). When the external detection switch 4 is triggered to be turned off by the trigger signal St, the dimming end DIM is floating during time t0 to time t1. Therefore, a low-level signal indicates that the oscillation circuit 3 is not activated. The oscillation circuit 3 controls the switch Q to be normally on through the dimming signal Vg, and therefore the conversion circuit 1 is controlled to provide the DC (direct-current) output voltage Vo to control the LED lamp 200 to provide the first brightness (for example, 100% brightness). When the external detection switch 4 is triggered to be turned on by the trigger signal St, the dimming end DIM is grounded (i.e., coupled to the bus negative end LED(−)) during time t1 to time t2. Therefore, a high-level signal indicates that the oscillation circuit 3 is activated. The oscillator circuit 3 controls the switch Q to be repeatedly turned on and turned off through the dimming signal Vg with a fixed frequency and a duty cycle so as to control the conversion circuit 1 to provide a DC output voltage Vo with a fixed frequency and a duty cycle, thereby controlling the LED lamp 200 to provide the second brightness (for example, 30% brightness).

Figure 5C:
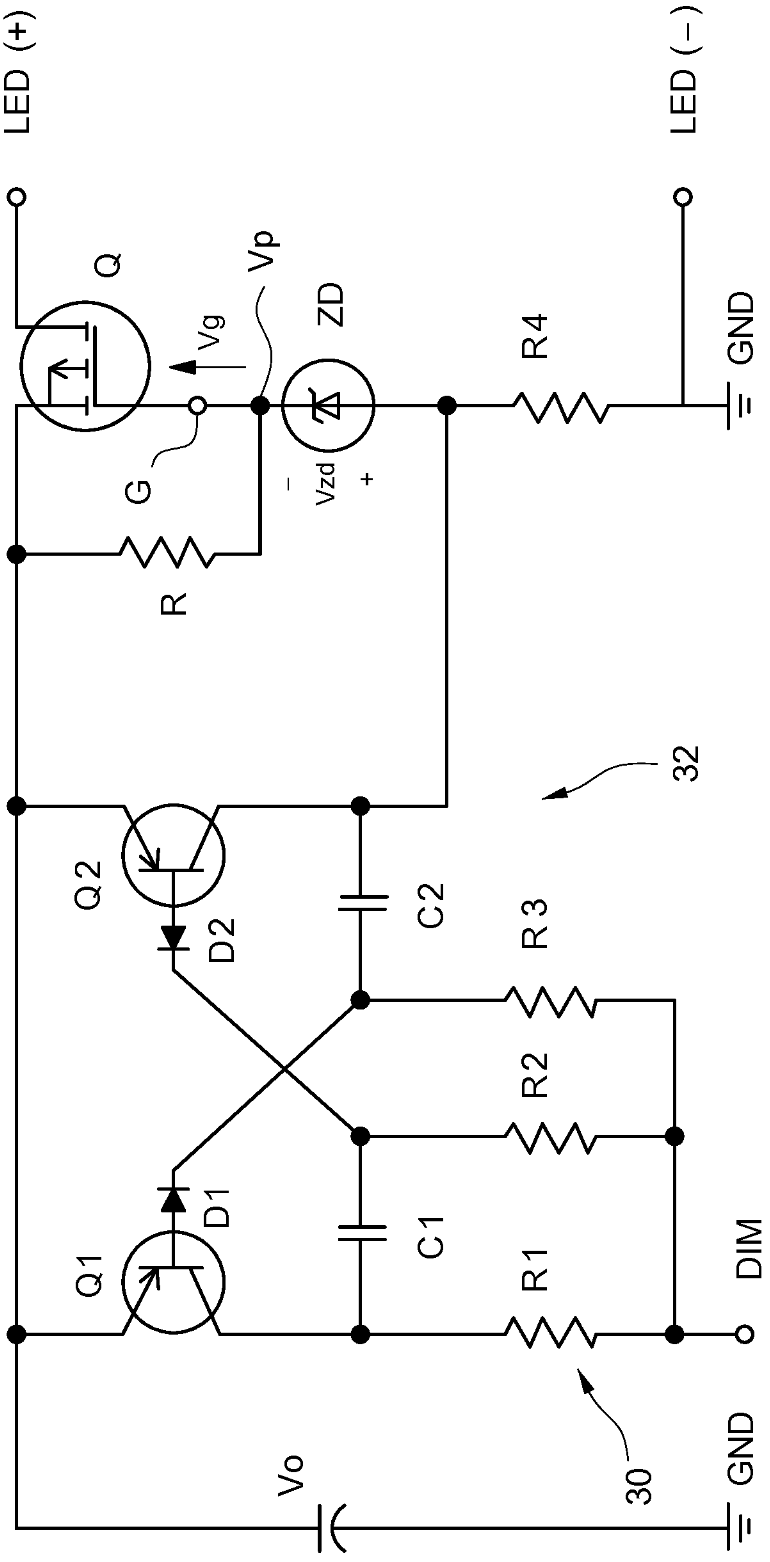
FIG. 5C is a block diagram of the oscillation circuit according to a second embodiment of the present disclosure.

Please refer to FIG. 5C, which shows a block diagram of the oscillation circuit according to a second embodiment of the present disclosure, and also refer to FIG. 2 to FIG. 5B. The major difference between the internal circuit of the oscillation circuit 3 of this embodiment and the internal circuit of the oscillation circuit 3 of FIG. 3C is that the first transistor Q1 and the second transistor Q2 are PNP transistors, and the switch Q is a P-type MOSFET. When the external detection switch 4 is triggered to be turned off, the switch Q is turned on by the divided voltage Vp generated between the second charging/discharging circuit 32 and the voltage dividing resistor R according to the output voltage Vo. When the external detection switch 4 is triggered to be turned on, the dimming end DIM of the oscillation circuit 3 is coupled to the bus negative end LED(−) (i.e., the dimming end DIM is grounded), the dimming signal Vg with a fixed frequency and a duty cycle is provided to control the switch Q to be turned on and turned off repeatedly. Therefore, in comparison with the oscillator circuit 3 of FIG. 3C, positions and coupling relationships of the first charging/discharging circuit 30, the second charging/discharging circuit 32, the first transistor Q1, the second transistor Q2, and the voltage dividing resistor R shown in FIG. 5C are opposite to those in FIG. 3C, but the detailed control manners are similar to those in FIG. 3C. The coupling relationships of the details is shown in FIG. 5C, which will not be repeated here. Similar to FIG. 3C, the first charging/discharging circuit 30 further includes a first diode D1 and the second charging/discharging circuit 32 further includes a second diode D2, and coupling positions and functions thereof are similar to those of FIG. 3C, so it will not be repeated here.

Figure 6A:
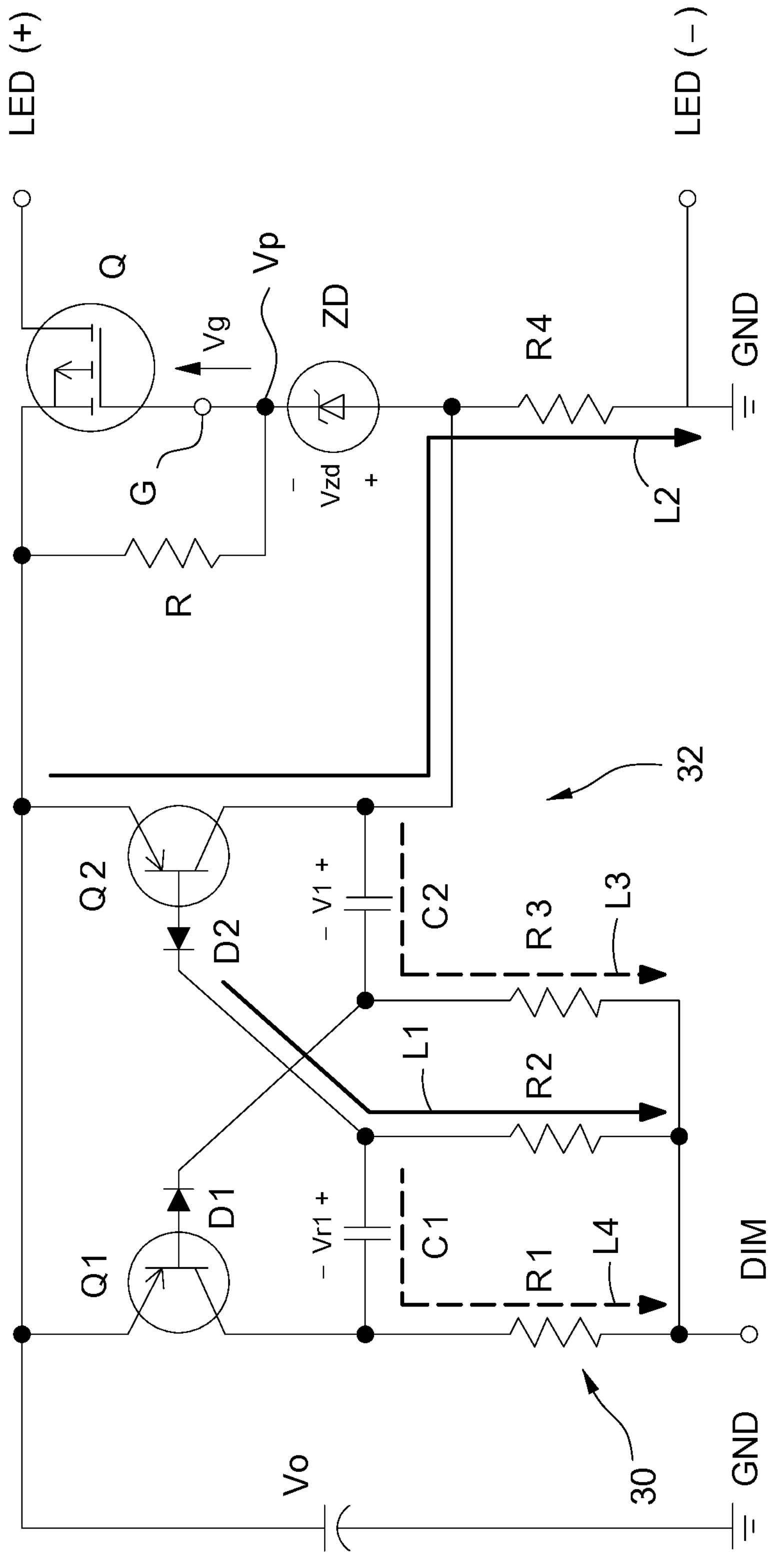
FIG. 6A is a schematic diagram of a first state of a current path of the oscillation circuit according to a second embodiment of the present disclosure.
Figure 6B:
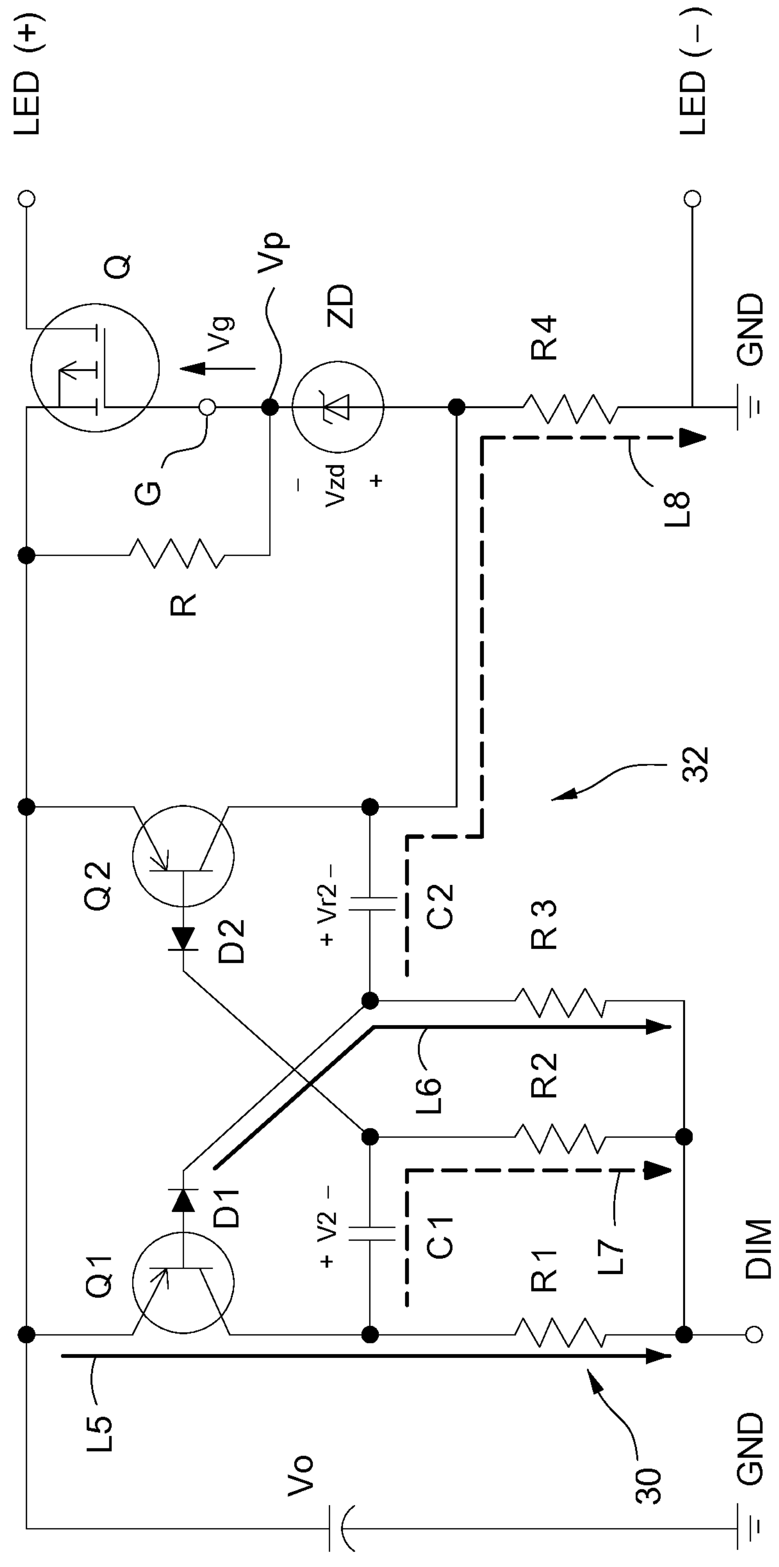
FIG. 6B is a schematic diagram of a second state of a current path of the oscillation circuit according to the second embodiment of the present disclosure.

Please refer to FIG. 6A and FIG. 6B which show schematic diagrams of a first state and a second state of a current path of the oscillation circuit according to a second embodiment of the present disclosure. The second resistor R2 and the third resistor R3 are starting resistors of the second transistor Q2 and the first transistor Q1, respectively. When the external detection switch 4 is triggered to be turned on by the trigger signal St, the dimming end DIM is coupled to the bus negative end LED(−) through the external detection switch 4. In this condition, one of the first transistor Q1 and the second transistor Q2 is first turned on. FIG. 6A illustrates the turning on of the second transistor Q2, and current paths L1 and L2 are for the saturation mode in which the second transistor Q2 is turned on, and current paths L3 and L4 prepare for turning on the first transistor Q1. FIG. 6B illustrates the turning on of the first transistor Q1, and current paths L5 and L6 are for the saturation mode in which the first transistor Q1 is turned on, and current paths L7 and L8 prepare for turning on the second transistor Q2. Accordingly, during the continuous turned-on and turned-off process of the first transistor Q1 and the second transistor Q2, a fixed low-frequency oscillation is provided to control the switch Q to be turned on and turned off so as to realize the bi-level dimming function. In one embodiment, the detailed current paths in FIG. 6A and FIG. 6B and the configuration of the resistance values of the second resistor R2 and the third resistor R3 are similar to those of FIG. 4A and FIG. 4B, and details are not repeated here.

Figure 7:
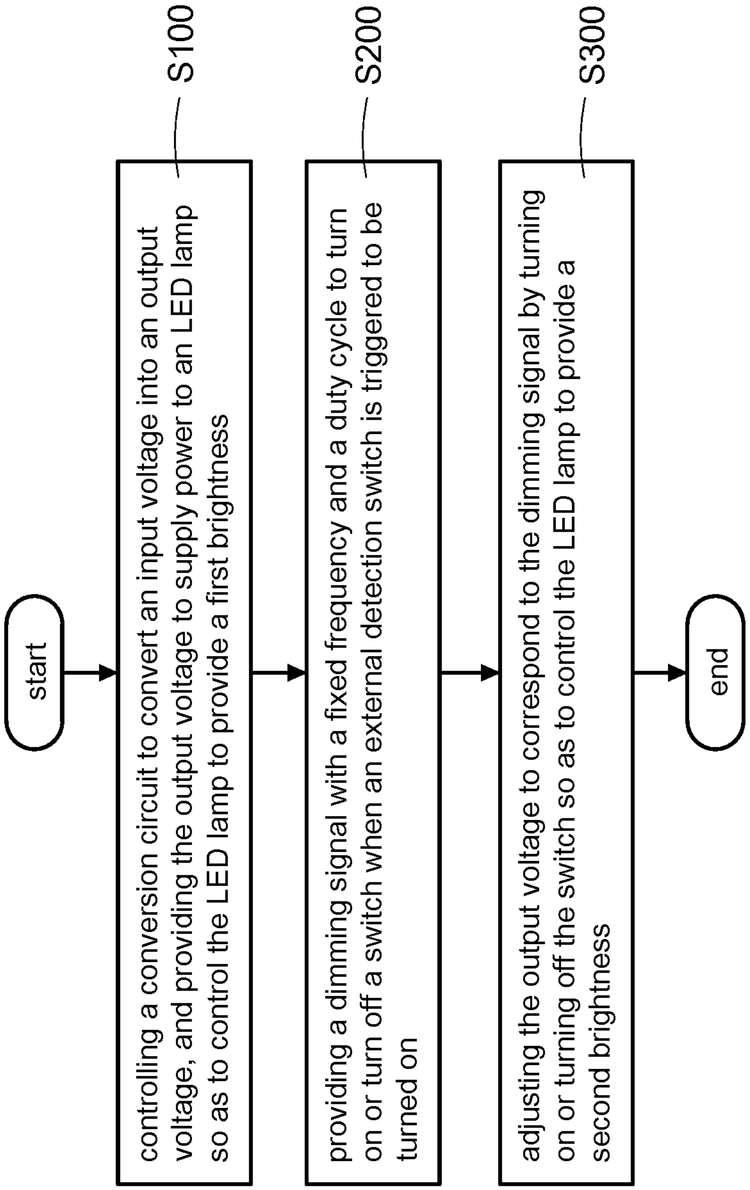
FIG. 7 is a flowchart of a bi-level dimming method of the LED power supply according to the present disclosure.

Please refer to FIG. 7, which shows a flowchart of a bi-level dimming method of the LED power supply according to the present disclosure, and also refer to FIG. 1 to FIG. 6B. The method is mainly applied to the bi-level dimming function of the LED lamp 200. The method includes steps of: first, controlling a conversion circuit to convert an input voltage into an output voltage, and providing the output voltage to supply power to an LED lamp so as to control the LED lamp to provide a first brightness (S100). In one embodiment, the conversion circuit 1 converts the input voltage into the output voltage Vo, and provides the output voltage Vo to supply power to the LED lamp 200 through the bus positive end LED(+) and bus negative end LED(−) so as to control the LED lamp to provide the first brightness. In particular, the output voltage Vo of the conversion circuit 1 for controlling the LED lamp 200 to provide the first brightness may be a constant voltage, and the first brightness may be 100% brightness.

Afterward, providing a dimming signal with a fixed frequency and a duty cycle to turn on or turn off a switch when an external detection switch is triggered to be turned on (S200). When the external detection switch 4 is triggered to be turned on by the trigger signal St, the oscillation circuit 3 is coupled to the other of the bus positive end LED(+) and the bus negative end LED(−) according to the position where the external detection switch 4 is coupled to the bus positive end LED(+) or the bus negative end LED(−) so that the oscillation circuit 3 provides a dimming signal Vg with a fixed frequency and a duty cycle to the switch Q. Finally, adjusting the output voltage to correspond to the dimming signal by turning on or turning off the switch so as to control the LED lamp to provide a second brightness (S300). In one embodiment, the oscillator circuit 3 controls the switch Q to be repeatedly turned on and turned off through the dimming signal Vg with a fixed frequency and a duty cycle so as to adjust the output voltage Vo to a voltage waveform with a fixed frequency and a duty cycle, thereby controlling the LED lamp 200 to provide the second brightness (for example, 30% brightness) according to the output voltage Vo.

Incidentally, the specific circuit components and their coupling relationships included in each circuit are not limited. Any implementations such as circuits and controllers (with internal software control) that can achieve the above functions should be included in the scope of the present disclosure.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. An LED power supply with bi-level dimming, configured to receive an input voltage to supply power to an LED lamp, and adjust the brightness of the LED lamp according to whether an external detection switch is triggered to be turned on, the LED power supply comprising:

a conversion circuit, configured to convert the input voltage into an output voltage, and provide the output voltage to supply power to the LED lamp through a bus positive end and a bus negative end so as to control the LED lamp to provide a first brightness, a switch, coupled to the bus positive end or the bus negative end, and an oscillation circuit, comprising a dimming end and a control end, wherein the control end is coupled to the switch, and the dimming end is coupled to the external detection switch, wherein the oscillation circuit comprises: a first charging/discharging circuit, coupled to the dimming end, a second charging/discharging circuit, coupled to the dimming end and the bus positive end, a first transistor, comprising a first end, a second end, and a control end, the first end of the first transistor coupled to the first charging/discharging circuit, the control end of the first transistor coupled to the second charging/discharging circuit, and the second end of the first transistor coupled to the bus negative end, a second transistor, comprising a first end, a second end, and a control end, the first end of the second transistor coupled to the second charging/discharging circuit and the control end of the oscillation circuit, the control end of the second transistor coupled to the first charging/discharging circuit, and the second end of the second transistor coupled to the bus negative end, and a voltage diving resistor, coupled to the second charging/discharging circuit and the bus negative end, wherein the oscillation circuit is coupled to the other of the bus positive end and the bus negative end through the dimming end when the external detection switch is turned on so as to provide a dimming signal with a fixed frequency and a duty cycle to the switch through the control end; the switch correspondingly adjusts the output voltage according to the dimming signal to control the LED lamp to provide a second brightness and wherein the external detection switch is triggered to be turned off, the switch is turned on by a divided voltage generated between the second charging/discharging circuit and the voltage dividing resistor according to the output voltage.

2. The LED power supply with bi-level dimming as claimed in claim 1, wherein the switch is coupled to the bus negative end, and the external detection switch is coupled to the bus positive end; the switch is normally turned on when the external detection switch is triggered to be turned off so as to control the first brightness.

3. The LED power supply with bi-level dimming as claimed in claim 1, further comprising:

a clamping circuit, coupled between the second charging/discharging circuit and the voltage diving resistor, wherein the clamping circuit is configured to provide a clamping voltage according to the output voltage being greater than a threshold value so as to control the divided voltage to be lower than a predetermined value.

4. The LED power supply with bi-level dimming as claimed in claim 1, wherein the output voltage charges the second charging/discharging circuit to a first predetermined voltage through the dimming end to turn on the first transistor so that the first charging/discharging circuit provides a first reverse voltage to turn off the second transistor and the output voltage charges the first charging/discharging circuit through the dimming end; the output voltage charges the first charging/discharging circuit to a second predetermined voltage through the dimming end to turn on the second transistor so that the second charging/discharging circuit provides a second reverse voltage to turn off the first transistor and the output voltage charges the second charging/discharging circuit through the dimming end.

5. The LED power supply with bi-level dimming as claimed in claim 4, wherein the first charging/discharging circuit comprises:

a first resistor, a first end of the first resistor coupled to the dimming end, and a second end of the first resistor coupled to the first end of the first transistor, a second resistor, a first end of the second resistor coupled to the dimming end, and a second end of the second resistor coupled to the control end of the second transistor, and a first capacitor, a first end of the first capacitor coupled to the second end of the first resistor, and a second end of the first capacitor coupled to the second end of the second resistor, and wherein the second charging/discharging circuit comprises:

a third resistor, a first end of the third resistor coupled to the dimming end, and a second end of the third resistor coupled to the control end of the first transistor, a fourth resistor, a first end of the fourth resistor coupled to the bus positive end, and a second end of the fourth resistor coupled to the first end of the second transistor, and a second capacitor, a first end of the second capacitor coupled to the second end of the third resistor, and a second end of the second capacitor coupled to the second end of the fourth resistor, wherein the fourth resistor and the voltage diving resistor form a voltage dividing circuit, and the divided voltage is generated at a node between the fourth resistor and the voltage dividing resistor.

6. The LED power supply with bi-level dimming as claimed in claim 5, wherein the output voltage charges the first capacitor to the second predetermined voltage through a path formed by the second resistor and the first capacitor, and charges the first capacitor to the first reverse voltage through a path formed by the first resistor and the first capacitor; the output voltage charges the second capacitor to the first predetermined voltage through a path formed by the third resistor and the second capacitor, and charges the second capacitor to the second reverse voltage through a path formed by the bus positive end, the fourth resistor, and the second capacitor.

7. The LED power supply with bi-level dimming as claimed in claim 5, wherein a resistance of the second resistor is less than a resistance of the third resistor.

8. The LED power supply with bi-level dimming as claimed in claim 1, wherein the oscillation circuit is an LM555 timer.

9. A bi-level dimming method for an LED power supply, comprising steps of:

controlling a conversion circuit to convert an input voltage into an output voltage, and providing the output voltage to supply power to an LED lamp so as to control the LED lamp to provide a first brightness, providing a dimming signal with a fixed frequency and a duty cycle to turn on or turn off a switch when an external detection switch is triggered to be turned on, and adjusting the output voltage to correspond to the dimming signal by turning on or turning off the switch so as to control the LED lamp to provide a second brightness, providing a divided voltage of the output voltage to normally turn on the switch so as to control the LED lamp to provide the first brightness when the external detection switch is triggered to be turned off, providing a clamping voltage according to the output voltage being greater than a threshold value so as to control the divided voltage to be lower than a predetermined value, charging a first capacitor to a second predetermined voltage by the output voltage so as to turn on a first transistor according to the second predetermined voltage, and charging the first capacitor to a first reverse voltage when the first transistor is turned on so as to turn off a second transistor according to the first reverse voltage.

* * * * *